United States Patent [19]
Nguyen et al.

[11] Patent Number: 6,067,596
[45] Date of Patent: May 23, 2000

[54] FLEXIBLE PLACEMENT OF GTL END POINTS USING DOUBLE TERMINATION POINTS

[75] Inventors: Thu Q. Nguyen, Tomball; Hung Q. Phu, Friendswood, both of Tex.

[73] Assignee: Compaq Computer Corporation, Houston, Tex.

[21] Appl. No.: 09/153,821

[22] Filed: Sep. 15, 1998

[51] Int. Cl.$^7$ .................................................. G06F 13/00
[52] U.S. Cl. ........................... 710/129; 710/100; 326/30; 370/402
[58] Field of Search ................................. 710/129, 131, 710/100, 2, 126; 326/30; 709/300, 400; 712/10; 711/105, 148; 370/285, 402, 911; 713/400; 714/1

[56] References Cited

U.S. PATENT DOCUMENTS

| | | |
|---|---|---|
| 4,715,921 | 12/1987 | Maher et al. . |
| 4,910,593 | 3/1990 | Well . |
| 5,013,385 | 5/1991 | Maher et al. . |
| 5,029,284 | 7/1991 | Feldbaumer et al. .................... 307/443 |
| 5,596,757 | 1/1997 | Smith ...................................... 395/750 |
| 5,701,422 | 12/1997 | Kirkland, Jr. et al. . |
| 5,706,447 | 1/1998 | Vivio ....................................... 395/309 |
| 5,729,154 | 3/1998 | Taguchi et al. ............................ 326/30 |

OTHER PUBLICATIONS

*100 MHz GTL+ Layout Guidelines for the Pentium® II Processor and Intel 440BX AGPset*, AP–827 Application Note, Copyright © Intel Corporation 1997, Order No. 243735–001, pp. 1–34.

*Pentium® II Xeon™ Processor AT 400 MHz*, Copyright © Intel Corporation, Jun. 1998, Order No. 243770–001, pp. 1–96.

*Pentium® Xeon™ Processor/Intel ® 450NX PCIset AGTL+ Layout Guidelines*, AP–830 Application Note, Copyright © Intel Corporation, Jun. 1998, Order No. 243790–001, pp. 1–29.

*100 MHz 2–Way SMP Pentium® II Xeon™ Processor/ Intel® 440GX AGPset AGTL+ Layout Guidelines*, AP–829 Application Note, Copyright© Intel Corporation, Jun. 1998, ORder No. 243775–001, pp. 1–29.

*Intel® Pentium® II Xeon™ Processor Bus Terminator Design Guidelines*, Copyright © Intel Corporation, Jul. 1998, Order No. 243774–001, pp. 1–11.

Primary Examiner—Gopal C. Ray
Attorney, Agent, or Firm—Akin, Gump, Strauss, Hauer & Feld, LLP

[57] ABSTRACT

A highly parallel computer system including dual processors and dual memory controllers are coupled to an Assisted Gunning Transceiver Logic Plus (AGTL+) high speed system bus. The microprocessors are designed for a quad processor architecture requiring four processors and four connectors for the processors. To maintain signal timing and integrity in a dual processor/dual memory controller architecture, additional terminations are inserted. Printed circuit board space is conserved with a dual processor architecture. The additional connectors and traces to the additional connectors for the processors are no longer needed. Furthermore, with the dual processor design, there is no need for two additional termination cards.

20 Claims, 4 Drawing Sheets

FLEXIBLE PLACEMENT OF GTL END POINTS USING DOUBLE TERMINATION POINTS

BACKGROUND OF THE INVENTION

1. Field of the Invention

The present invention pertains to bus architecture in computer systems, and more specifically pertaining to terminations in a Assisted Gunning Transceiver Logic Plus (AGTL+) bus architecture using dual processors and dual memory controllers that are designed for a quad processor system.

2. Description of the Related Art

A computer system generally includes various system components coupled to one or more internal buses. Such an internal computer bus is made up of the electrical signal lines that connect the computer components. Typically, a computer bus is based on an industry standard so computer components of various types can be designed to operate on the bus. New bus designs are often introduced which provide increased bandwidth over prior bus designs.

As processors, memories, and other components increase in speed, printed circuit board (PCB) connections that allow these components to communicate with one another begin to behave like transmission lines. These transmission line characteristics were always present, but as edge rates increase and the transmission rates increase, the effective line lengths become longer and the transmission line effects become especially important — important to the degree that if they are not addressed, the system may not work. Reflections in the transmission line cause distortions of the signal at the receiving end of the line. These distortions can cause false triggering in clock lines, can cause erroneous information on data, address and control lines, and can contribute significantly to clock and signal jitter.

Concerns previously relegated to the analog world, such as transmission line effects, are now affecting whether a digital design works at high speed. System designers have used Gunning Transceiver Logic (GTL) bus technology to address these concerns. Various versions of GTL are being implemented to ensure signal quality for the newest generation of processors.

The higher speed processors are typically used on higher speed computer buses using GTL (and its variants) bus technology. For example, a recent processor from Intel Corporation of Santa Clara, Calif., is the PENTIUM II XEON processor (herein referred to as the XEON processor). Some features of the XEON processor include a dynamic execution micro architecture, single edge contact (S.E.C.) cartridge package technology, 100 MHz system bus speeds data transfer between the processor and the system, dual independent bus architecture, and level 2 (L2) cache. These features are described in detail in the publication Intel Pentium® II XEON™ Processor at 400 MHz, June 1998, which is herein incorporated by reference in its entirety. The XEON processor is designed to operate in a quad (4) processor architecture, that is four multiprocessors operating on a common bus. Thus, the XEON processor or a processor of this type referred to according to the present invention as a quad processor. Operating at the higher computer bus speeds required impedance matching of all loads on the computer bus to ensure signal quality and integrity. XEON processors have their own termination circuitry for this purpose. Due to the existence of this termination, using XEON processors is not recommended in a daisy chain topology, a technique that was previously acceptable in previous Intel P6 Family processors. In a daisy chain topology, the loads, e.g., processors and memory controllers, are serially connected, one next to the other.

The XEON processor is the first slot 2 processor. Slot 2 refers to the connector of the Single Edge Contact (SEC) cartridge plugs into, just as the PENTIUM PRO processor uses Socket 8. The SEC cartridge typically includes the core processor and L2 cache memory on a single substrate. The SEC cartridge allows the L2 memory cache to remain tightly coupled to the core processor. L2 cache communication occurs at full speed of the processor core (compared to half the processor speed in the PENTIUM II processor). Furthermore, each XEON processor includes termination circuitry for the processor's AGTL+ bus to insure signal quality and integrity for communications at 100 MHz.

In addition, to maintain impedance matching with the XEON processor internal termination circuitry and timing due to data transfer rates, Intel recommends a quad (4) processor architecture with a single chipset for 100 MHz bus operation. System designers are hampered with Intel's requirements. Thus, the designers are prevented from designing efficient systems at optimal prices to meet customers needs. Other architectures, for example, a dual processor and dual chipset architecture are not recommended for 100 MHz operation. Flexibility in architecture allows designers to customize the system, emphasizing features, such as memory access, that might be desired by consumers.

To maintain signal timing and integrity of a dual XEON processor/dual memory controller/bridge configuration, the loads need to be placed close to one another. An additional constraint faced by the designer is board real estate. Board real estate is limited in a highly populated board. Additional layers can be added but cost of the board will escalate and these additional layers only add to trace lengths which have strict limits.

Although the tight design constraints for the quad processor host bus are thought to be necessary to achieve maximum performance, Intel's proposed implementation substantially limits system design flexibility and does not allow for all product requirements.

The proposed implementation is very large and expensive to build. The XEON processor alone requires several square inches of board space. The system logic to support the XEON host bus, such as the memory controller and I/O bridge also requires a large area of board space. To maintain signal integrity, the width and height of traces or the processor board must be maintained within tight tolerances, which becomes increasingly difficult as the size of the board increases.

SUMMARY OF THE INVENTION

According to the present invention, processors designed for a quad (4) processor system architecture are implemented in a dual processor, dual memory controller system. The system utilizes a highly parallel system architecture of processors, memory controllers, and parallel input/outputs (I/O). Furthermore, the system bus utilizes AGTL+ bus technology operating at around 100 MHz. The topology is such that dual processors and dual memory controllers are laid out in a daisy-chained fashion on the system bus. In a daisy chain topology, the loads, e.g., processors and memory controllers, are serially connected, one next to the other. This is different than a star topology, where all loads are connected to a single point. The physical topography is such that the processors, memory controllers, and system memory are laid out on a printed circuit board (PCB) in a symmetrical manner from a point of reference. In this configuration, timing is maintained and board real estate is saved, while reducing the number of layers necessary to implement the board. To maintain system integrity on the system bus, terminations are added to each processor.

DETAILED DESCRIPTION OF INVENTION

At the outset, a more detailed explanation of computer bus/transmission line phenomenon and the design problems is provided to aid in the understanding the present invention.

Prior system buses incorporating pre-XEON Intel processors typically used GTL bus technology. GTL is an incident wave switching, open drain bus with pull-up resistors that provide both the high logic level and termination. The GTL environment is designed with controlled impedances that supports high speed data transfers. The use of GTL requires that the design engineers use passive termination devices, know how to use them, and select components for performance, cost, and manufacturing economy.

Printed circuit board traces were always transmission lines. In the past, however, the devices that drove the traces usually had signal edge rise and fall times that were more than twice the time it took for the wave to propagate through the trace, so simpler lumped element models were valid. The transmission line effects need to be considered when the rise or fall time is less than the value calculated by the following equation:

$$(\text{Rise or Fall Time}) \leq \frac{(\text{Trace Length}) \times \sqrt{\varepsilon_{\textit{eff}}}}{C}$$

C=Speed of Light=$3 \times 10^8$ meters per second and $\epsilon_{\textit{eff}}$=relative dielectric constant of a PCB.

For example, consider 0.3 m of 50W circuit board trace. Given that typical relative dielectric constant ($\epsilon_{\textit{eff}}$) for a 50W trace FR4 glass/epoxy board is 3.5, $$RISE \leq .3 \times \frac{\sqrt{3.5}}{3 \times 10^8} = 1.87 \text{ nanoseconds}$$

Rise time for GTL signals can typically be less than 0.5 nanoseconds, thus transmission line effects dominate. These effects appear as over shoot, under shoot, ringing, or stair step waveforms on the trace if the loads or the drivers are improperly matched.

For high performance designs, matching is required. The ideal transmission line circuit halves the impedance of the driver, and the impedance of the load equals the intrinsic impedance of the trace. Therefore, all of the energy of the driving device is ideally transferred to the load. If there is a mismatch between the load and a transmission line, some energy is reflected back to the transmission line from the load. The amount of energy reflected back to the transmission line can be calculated by the following equation:

$$\text{reflection coefficient} \lambda = \frac{Z_l - Z_o}{Z_l - Z_o}$$

where $Z_1$ is the impedance of a load and $Z_0$ is the intrinsic impedance of a transmission line.

Reflection can frequently be seen on the trace as a stair step waveform. This is due to the superposition of waves reflected by the load, returning to the source, reflected at the source, and returning to a load. This process continues until the energy in the repeated reflections is dissipated in a load, source resistance, and the losses in the transmission line.

New bus designs often seek to address these issues by specifying limits on the electrical and mechanical characteristics of the bus, such as trace length, number of loads, and required termination. Bus termination is often required to improve signal reflections. In addition, bus termination must be made at the correct specific locations on the bus, such as the ends of the bus, in order to be effective. This requirement can limit the system designer's flexibility regarding the bus devices and options to expand the bus.

One such proposed bus standard addressing the aforementioned problems is the Pentium® II XEON™ processor bus by Intel Corporation of Santa Clara, Calif. (herein referred to as the XEON Host Bus), which is designed to be a high performance, high speed multiprocessor interconnect bus for servers and workstations. The XEON host bus is primarily intended for the XEON processor. The XEON processor is a follow-on to the PENTIUM PRO and PENTIUM II processors. Predecessor processors operated on host buses with bus speeds of 66 MHz. The XEON host bus operates at bus speeds greater than 66 MHz, typically around 100 MHz. The XEON processor implements a Dynamic Execution micro-architecture. This enables the processor to deliver higher performance than the Pentium processor, while maintaining binary compatibility with all previous Intel Architecture processors. As has been mentioned, this type of processor or one performing according to its specification is referred to as a quad processor according to the present invention.

The XEON host bus standard is based on a signal protocol as well as certain electrical and mechanical specifications. In order to assure maximum performance, Intel has published several guidelines that are provided to help system designers meet the very tight electrical and mechanical design constraints for the bus standard, including strict bus termination requirements. Intel has also proposed a bus implementation that meets the XEON host bus standard. However Intel's proposed bus implementation limits the possible options for incorporating computer components and design layout flexibility.

The XEON host bus architecture provides high bandwidth and uses Assisted Gunning Transceiver Logic Plus (AGTL+) Input/Output (I/O) buffer technology. Predecessors of AGTL+ bus technology were Gunning Transceiver Logic (GTL) and Gunning Transceiver Logic Plus (GTL+). GTL is used by some of the pre-XEON processors. A GTL bus is designed to work with lower voltage swings. The input buffer works like an analog comparator rather than an inverter. This allows the GTL inputs to switch quickly without needing to be driven rail-to-rail. Driver output swings of 0.8 V to 1 V, with input $V_{il}/V_{IH}$ swings of a 100 mV, are common. Initially, GTL drivers were designed to pull a 1.2 V signal down to 0.4 V when it switches on. The 0.4 $V_{OL}$ is common for an n-channel MOSFET pull-down device in saturation. However, this places the reference voltage for the input comparator at 0.8 V, which makes such devices susceptible to ground bounce noise.

A variant of GTL, called GTL+, is being used on the Intel Pentium® Pro processor to address this noise margin concern. In GTL+, the termination reference voltage is raised to 1.5 V, with the noise driver pulling down to VOL of 0.5 V. This gives another 200 mV of noise margin, and moves the input comparator reference voltage out of the range of most ground bounce noise.

AGTL+ buffers are open-drain and require pull-up resistors for providing the high logic and termination. AGTL+ buffers differ from GTL+ buffers with the addition of an active pMOS pull-up transistor to "assist" the pull-up resistors during the first clock of a low-to-high voltage transition. As has been discussed, in order to achieve that desired high performance and to assure signal integrity, Intel has imposed strict electrical and mechanical constraints or guidelines for a computer system implementing the XEON host bus. (See e.g., Intel Application Note AP-830, Pentium II XEON Processor/Intel 450NX PCIset AGTL+ Layout Guidelines, herein incorporated by reference). These guidelines include limitations on bus trace length, trace topology, and device positioning. In particular, the XEON host bus standard specifies a maximum of six XEON host bus loads. Also, XEON host bus processors must reside on the electrical ends of the bus. In addition, the XEON host bus is required to be electrically terminated at both ends, and XEON host bus devices are required to be evenly spaced along the XEON host bus. Furthermore, the XEON processor is designed for use in a quad processor system. For use in a dual processor architecture, Intel recommends insertion of terminations in lieu of the other two processors. These are only a few of the specified guidelines. As can be seen, they are significant constraints on design.

Figure 1:
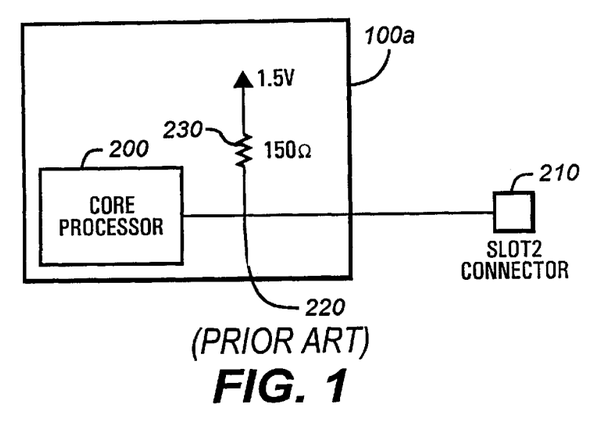
FIG. 1 illustrates the termination circuitry of the quad processor (prior art.)

FIG. 1 illustrates the termination circuitry of the XEON processor 100a and a slot 2 connector 210. The termination circuitry includes a terminating resistor 230 pulled up to a voltage $V_{TT}$ of 1.5 volts. The terminating resistor 230 is electrically located between core processor 200 and the slot 2 connector 210 at reference point, on-card fork 220. As noted in FIG. 1, the impedance value of the XEON terminating resistor 230 is 150Ω. Table 1 provides the description and lengths of segments L1, L2 and L3 specified by Intel.

TABLE 1

Segments, Descriptions and Lengths of a XEON processor.

| Segment | Description | Min. Length (inches) Max. Length (inches) |
|---|---|---|
| L1 | Processor core package pin to on-card fork | Fixed length in Pentium II XEON processor package. |
| L2 | Stab length of on-card resistor | Minimum and maximum traces in Pentium II XEON processor package. |
| L3 | Slot 2 edge finger to on-card fork | Minimum and maximum traces in Pentium II XEON processor package. |

Intel has several recommended topologies for the XEON processor including the double star and crow's foot topology. Although Intel specifies both five and six load topologies (a load typically refers to a processor or chipset) for the double star and crow's foot topology, Intel's simulation have shown computer bus speeds of a six load topology to typically reach 90 MHz. With five load double star or crow's foot topologies, computer bus speeds were typically shown to operate at 100 MHz.

Figure 2A:
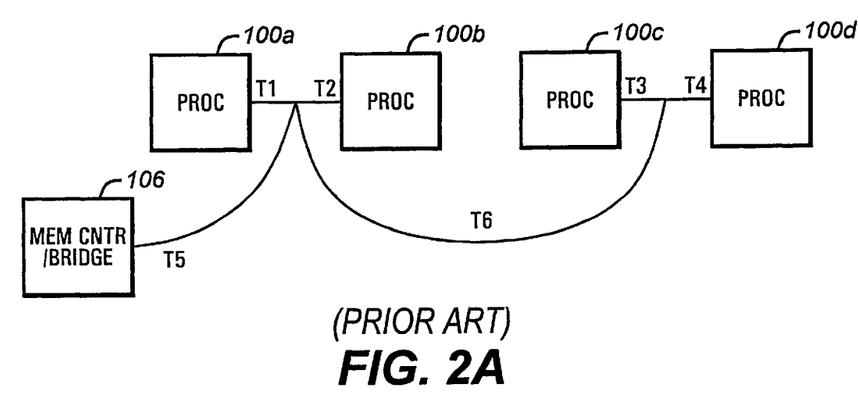
FIG. 2A illustrates a recommended prior topology of the quad processor.

FIG. 2A is a double star topology utilizing five loads recommended by Intel. The processors 100a, 100b, 100c, and 100d are arranged in pairs of two processors with a memory controller/bridge 200 hanging from one of the pairs of processors 100a and 100b. Table 2 provides the timing between loads specified by Intel.

TABLE 2

Timing associated with net segments.

| Segment | Times |
|---|---|
| T1 | 175 ps |
| T2 | 175 ps |
| T3 | 175 ps |
| T4 | 175 ps |
| T5 | 525 ps |
| T6 | 700 ps |

The stated times in ps for Table 2 associated with the segments represent electrical distances which in actual processor structure depend in length on transmission line, geometry, board dielectric, propagation speed and loading.

Figure 2B:
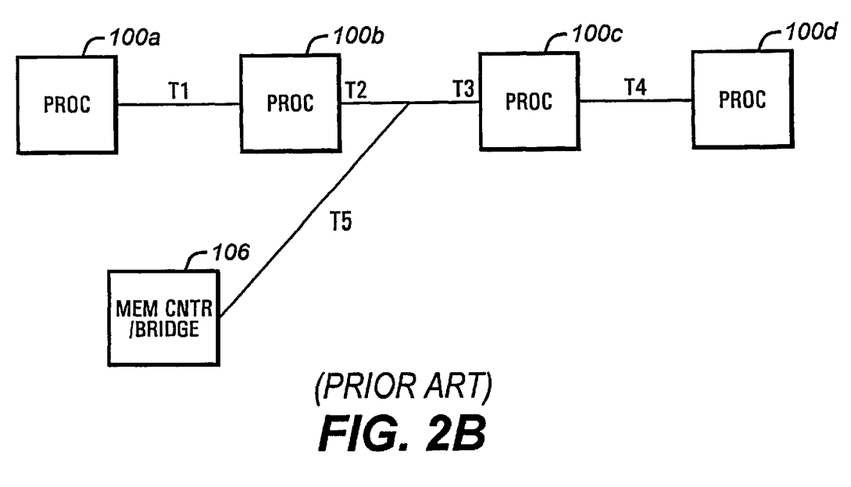
FIG. 2B illustrates a recommended prior topology of the quad processor.

FIG. 2B is another recommended Intel topology, namely a "crow's foot" topology utilizing 5 loads. The processors 100a, 100b, 100c, and 100d are serially connected together with a memory controller/bridge 300 hanging between processors 100b and 100c. Table 3 provides the timing between loads.

TABLE 3

Timing associated with net segments.

| Segment | Times |
|---|---|
| T1 | 350 ps |
| T2 | 117 ps |
| T3 | 234 ps |
| T4 | 350 ps |
| T5 | 805 ps |

As with Table 2, the times in Table 3 associated with the segments represent electrical distances which depend on transmission line, geometry, board dielectric, propagation speed and loading.

Intel's recommended topologies utilize quad (4) XEON processors. Each processor utilizes hundreds of traces. To implement a dual processor XEON system, the two extra processors are removed from the slot 2 connector and replaced with dummy termination cards. See Intel Pentium II XEON Processor Bus Terminator Design Guidelines, July 1998, herein incorporated by reference in its entirety.

These topologies limit the designer to a single memory controller/bridge and specific placement of the loads, namely the processors and memory controller/bridge. Furthermore, board real estate is not utilized efficiently when using the XEON processors in a dual configuration, since the quad processor configuration is laid out with two dummy termination cards inserted into the slot 2 connectors in place of the two missing processors. Therefore with Intel's topology for a dual processor configuration, board real estate is consumed by slot 2 connectors and the traces to the slot connectors for a quad processor system.

Figure 3:
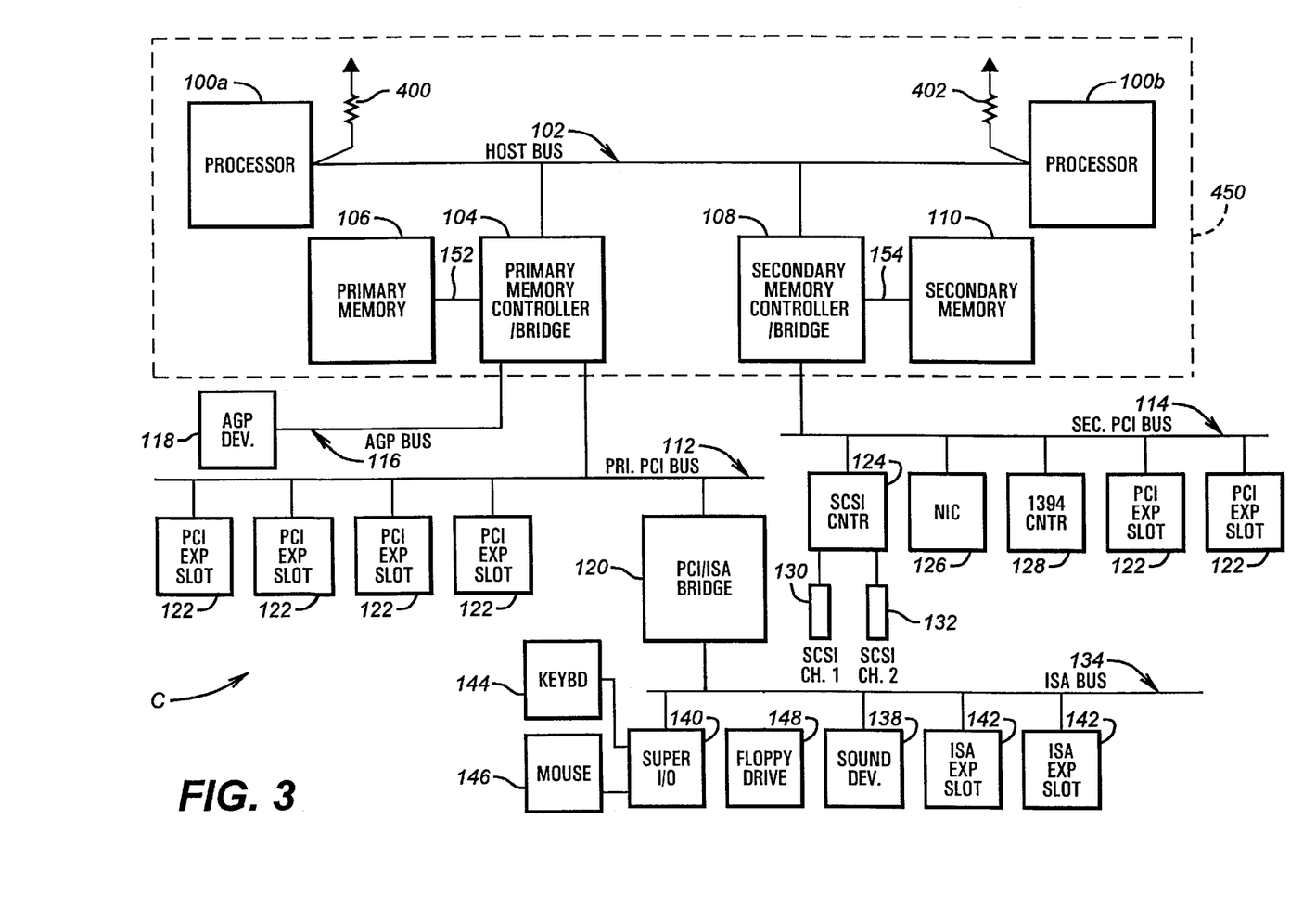
FIG. 3 is a block diagram illustrating a dual processor/dual memory controller system architecture featuring quad processors according to the present invention.

Turning now to FIG. 3, a computer system C according to the present invention is illustrated. The computer system C includes two processors 100a and 100b, such as Intel Pentium® II XEON™ processors, or the like. The XEON processor is referred to as a quad processor because it is typically designed for a four (4) processor architecture. The processors 100a and 100b are coupled to either ends of a XEON host bus 102. Termination bus resistors 400 and 402 are coupled to the XEON host bus 102.

Also coupled to the XEON host bus 102 are two chipsets, namely a primary memory controller/host-to-PCI/APG (advanced graphics port) bridge 104 and a secondary memory controller/host-to-PCI bridge 108. Primary memory controller/host-to-PCI bridge 104 provides address and control signals to primary memory 106 via line 152, and secondary memory controller/host-to-PCI bridge 108 provides address and control signals to secondary memory 110 via line 154. Primary memory 106 and secondary memory 110 can be comprised of a plurality of dynamic random access memory (DRAM) devices (not specifically shown). The primary memory controller/host-to-PCI/APG bridge 104 and secondary memory controller/host-to-PCI bridge 108 translate processor cycles into peripheral component interconnect (PCI) cycles, and vice versa, for connecting to a primary PCI bus 112 and a secondary PCI bus 114, respectively.

Also connected to the primary PCI bus 112 is a PCI/ISA (industry standard architecture) bridge 120, and one or more PCI expansion slots, each designated as 122. The primary memory controller/host-to-PCI/APG 104 also translates processor cycles into AGP cycles, and vice versa, for connecting to a AGP bus 116. An AGP device 118 is coupled to the AGP bus 116. The AGP device 118 provides the necessary interface to a monitor (not specifically shown).

The PCI/ISA bridge 120 translates PCI cycles to ISA cycles, and vice versa, for connecting to an ISA bus a sound device 138, a super I/O device 140, and one or more ISA expansion slots 142. Also coupled to the super I/O device 140 are a keyboard 144 and a mouse 146. A floppy drive 148 is coupled to the super I/O device 140.

Coupled to the secondary PCI bus 114 are a SCSI (small computer serial interface) controller 124, a NIC (network interface controller) device 126, a 1394 controller (or FIREWIRE) device 128, and one or more PCI expansion slots 122.

Figure 4:
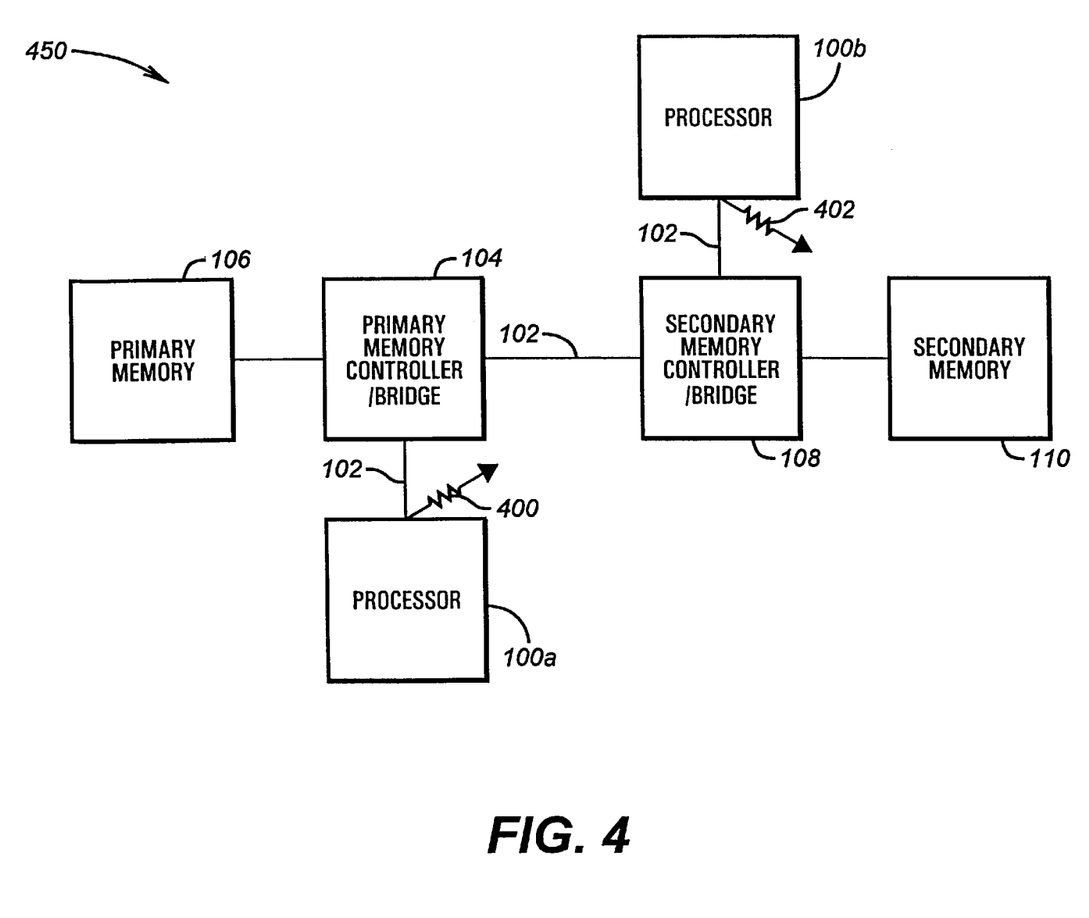
FIG. 4 illustrates a front end bus topology featuring dual quad processors/dual memory controllers according to the present invention.

One embodiment of a dual processor/dual memory controller/bridge configuration according to the present invention on a layer board is illustrated in FIG. 4. FIG. 4 illustrates the front end 450 of computer C. The front end 450 includes a daisy-chained (serially connected) memory controller/bridge configuration between dual XEON processors on a Xeon host bus and memories for each memory controller. Processor 100a is coupled to primary memory controller/bridge 104 and processor 100b is coupled to secondary memory controller/bridge 108 on the XEON host bus 102. Primary memory 106 is coupled to primary memory controller/bridge 104 and secondary memory 110 is coupled to secondary memory controller/bridge 108. Furthermore, both primary and secondary memory controller/bridges 104 and 108 are coupled together. In this configuration, timing between loads is maintained. To maintain signal integrity, terminating bus resistors to 1.5 Volts terminals 400 and 402 are connected to XEON host bus 102. Terminating bus resistor 400 is added to the XEON host bus 102 near processor 100a and terminating bus resistor 402 is added to the XEON host bus 102 near processor 100b.

Terminating bus resistors 400 and 402 are typically passive resistors. The terminating bus resistor 400 is located near processor 100a so that a resultant impedance of the termination circuitry of processor 100a (conventional resistor) (not shown) in parallel with terminating bus resistor 400 is formed. . Likewise, the terminating bus resistor 402 is located near processor 100b so that a resultant impedance of the termination circuitry of processor 100b (conventional resistor) (not shown) in parallel with terminating bus resistor 402 is formed. A resultant impedance of primary processor 100a is typically equal to its conventional terminating resistor, connected in parallel with the termination bus resistor 400. A resultant impedance of secondary processor 100b is typically equal to its conventional terminating resistor, connected in parallel with the termination bus resistor 402. The addition of termination bus resistors 400 and 402 are provided according to the present invention to ensure that processor 100a and processor 100b provide the necessary impedances in a dual processor/dual memory controller architecture.

For impedance matching of the processors in the dual processor/dual memory controller topology, the resultant (or composite) impedance of the terminating bus resistor 400 connected in parallel with the primary processor's internal terminating resistor should equal the resultant impedance of the remaining loads, namely the secondary processor 100b, the primary and secondary memory controller/bridges 104 and 108, and the other terminating bus resistor 402. Likewise, the resultant impedance of the terminating bus resistor 402 connected in parallel with the secondary processor's internal terminating resistor should equal the resultant impedance of the remaining loads, namely the primary processor 100a, the primary and secondary memory controller/bridges 104 and 108, and the other terminating bus resistor 400. In the present invention, the trace impedance is approximately 60 ohms and the resultant impedance of the terminating bus resistor and processor internal terminating resistor typically equals around 66 ohms for proper impedance matching. The XEON processor's termination resistor 230 impedance is approximately 150 ohms. Therefore, to obtain the resultant impedance of around 66 ohms, the impedance of terminating bus resistors 400 and 402 should be approximately 120 ohms (i.e., a 150 ohm resistor connected in parallel with a 120 ohm resistor has an equivalent impedance of around 66 ohms).

Figure 5:
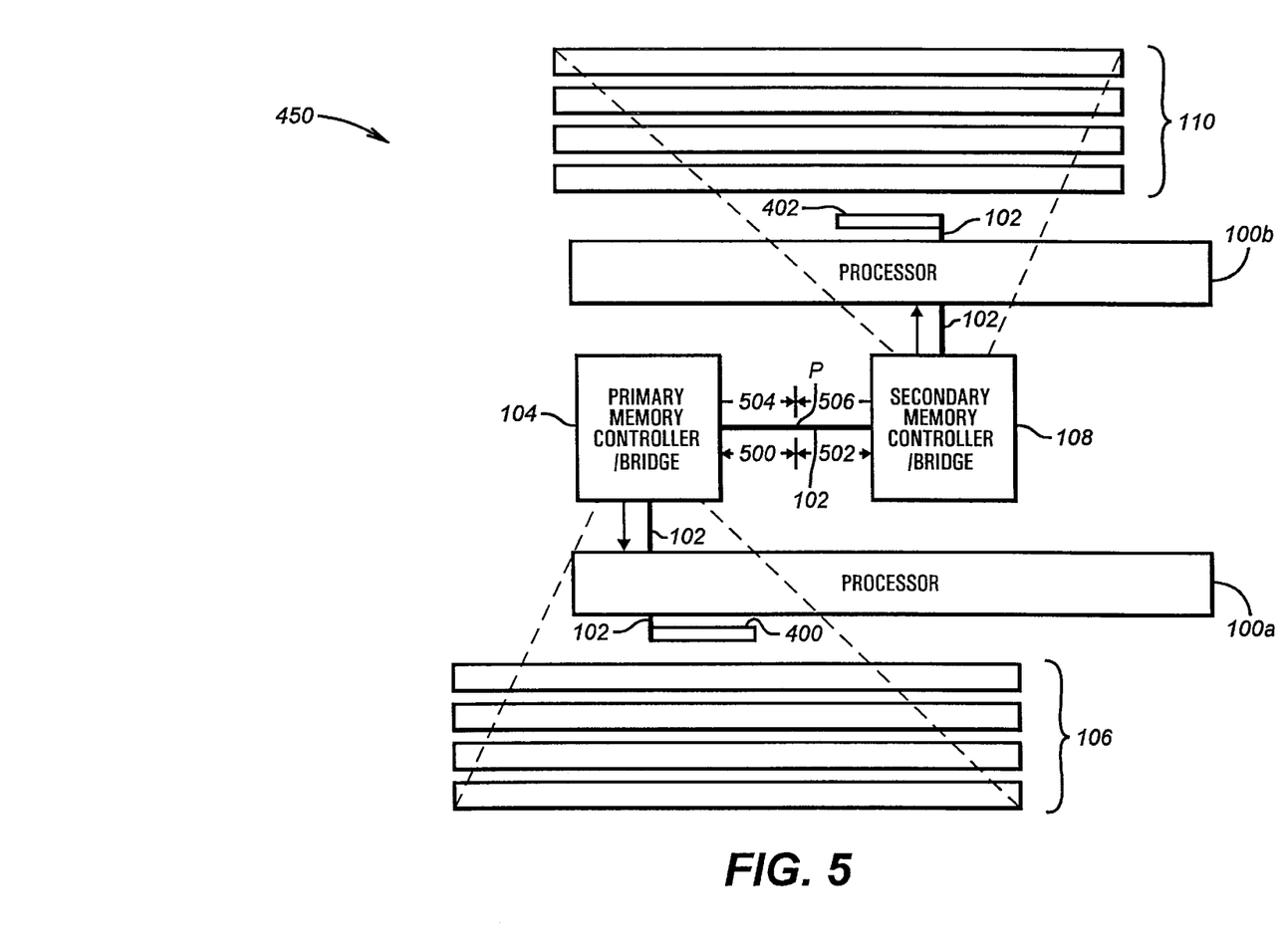
FIG. 5 illustrates a dual quad processors/dual memory controllers physical layout topography according to the present invention.

A topography or board layout of an embodiment of the present invention of the front end 450 is illustrated in FIG. 5. The loads and memories are arranged symmetrically to one another on the board. To ensure that timing requirements for data transfer between processor and memory controllers are met, processors and memory controller/bridges need to be closely located to one another. Furthermore, to ensure that timing requirements for data transfer between memory controller and memory are met, memory controller/bridges and memory need to be closely located to one another. The topography in FIG. 5, illustrates a tightly coupled dual processor/dual memory controller system according to the present invention. Primary and secondary memory controller/bridges 104 and 108 are serially connected together on the XEON host bus 102. The primary processor 100a is coupled to the primary memory controller/bridge 104 and these two components are closely located to one another. The secondary processor 100b is coupled to secondary memory controller/bridge 108 and these two components are closely located to one another. In this topography, the loads of the dual processor/dual memory controller system are serially connected and are tightly coupled. To maintain timing, the primary and secondary memory controllers 104 and 108 are located at positions equidistant as indicated by arrows 500 and 502 from a center point P on the XEON host bus 102. In addition, processor 100a and processor 100b are located at locations equidistant, as indicated by arrows 504 and 506 from the center point P on the XEON host bus 102.

Terminating bus resistor 400 is connected to the XEON host bus 102 near processor 100a. Terminating bus resistor 402 is added to the XEON host bus 102 near processor 100b. As discussed earlier, terminating bus resistors 400 and 402 are typically passive resistors. The terminating bus resistor 400 is located between processor 100a and primary memory 106. Likewise, the terminating bus resistor 402 is located near processor 100b at a location between processor 100b and secondary memory 110. The terminating bus resistor 400 is connected in parallel to the primary processor's internal terminating resistor and the terminating bus resistor 405 is connected in parallel to the secondary processor's internal terminating resistor.

As discussed previously, the loads of the dual processor/dual memory controller system need to be properly impedance matched. The resultant impedance of the terminating bus resistor 400 electrically in parallel with the primary processor's internal terminating resistor should equal the resultant impedance of the remaining loads, namely the secondary processor 100b, the primary and secondary memory controller/bridges 104 and 108, and the other terminating bus resistor 402. Likewise, the resultant impedance of the terminating bus resistor 402 connected in parallel with the secondary processor's internal terminating resistor should equal the resultant impedance of the remaining loads, namely the primary processor 100a, the primary and secondary memory controller/bridges 104 and 108, and the other terminating bus resistor 400.

In the present invention, the resultant impedance of the terminating bus resistor and processor internal terminating resistor typically equals around 66 ohms for proper impedance matching. The XEON processor's termination resistor 230 impedance is approximately 150 ohms. Therefore, to obtain the resultant impedance of around 66 ohms, the impedance of terminating bus resistors 400 and 402 should be approximately 120 ohms. (i.e., a 150 ohm resistor connected in parallel with a 120 ohm resistor has an equivalent impedance of around 66 ohms.)

It can be seen that there is no wasted board space when only two processors are needed or intended with two memory controllers. The additional slot 2 connectors and traces to the additional slot 2 connectors of the XEON recommended configuration are no longer needed. Furthermore, with the dual processor design, there is no need for slot 2 dummy termination cards.

The foregoing disclosure and description of the invention are illustrative and explanatory thereof, and various changes in the details of the illustrated apparatus and construction and method of operation may be made without departing from the spirit of the invention.

What is claimed is:

1. A multiprocessor computer system, comprising:

a computer processor bus having a first end and a second end;

a first quad processor coupled to said computer processor bus and located at said first end of said computer processor bus, said first quad processor having a first termination;

a first bus termination coupled to said computer processor bus and located inwardly of said first quad processor;

a second quad processor coupled to said computer processor bus and located at said second end, said second quad processor having a second termination;

a second bus termination coupled to said computer processor bus and located inwardly of said second quad processor;

a first chipset and a second chipset electrically connected and electrically located between said first quad processor and said second quad processor on said computer processor bus; and said first termination and said first bus termination exhibiting a composite impedance equal to impedance of said other elements coupled to said computer processor bus at an operating frequency.

2. The multiprocessor computer system of claim 1 wherein said first quad processor and said second quad processor are INTEL PENTIUM II XEON processors.

3. The multiprocessor computer system of claim 1 wherein said computer processor bus is an Assisted Gunning Transceiver Plus (AGTL+) bus.

4. The multiprocessor system of claim 1 wherein said first chipset is a memory controller/host-to-PCI/APG bridge and said second chipset is a memory controller/host-to-PCI bridge.

5. The multiprocessor computer system of claim 1 further comprising a primary memory coupled to said first chipset and a secondary memory coupled to said second chipset.

6. The multiprocessor computer system of claim 5 wherein said primary memory and said secondary memory are dynamic random access memories (DRAM).

7. The multiprocessor computer system of claim I wherein said operating frequency is greater than 66 MHz.

8. The multiprocessor computer system of claim 1 wherein said first bus termination and said second bus termination have an impedance of approximately 120 ohms.

9. The multiprocessor computer system of claim 1 wherein said composite impedance is approximately 66 ohms.

10. The multiprocessor computer system of claim 1 further comprising a floppy drive.

11. A multiprocessor computer system, comprising:

a computer processor bus;

a first chipset;

a second chipset;

said first chipset and said second chipset sharing said computer processor bus and being spaced equidistant on said computer bus from a center point on said computer processor bus;

a first quad processor coupled to said first chipset;

a second quad processor coupled to said second chipset; and said first quad processor and said second quad processor are located at positions spaced equidistant from one another from said center point on said computer processor bus.

12. The multiprocessor computer system of claim 1 further comprising:

a first bus termination coupled to said computer processor bus and located inwardly of said first quad processor;

said first quad processor having a first termination;

a second bus termination coupled to said computer processor bus and located inwardly of said second quad processor;

said second quad processor having a second termination; and said first termination and said first bus termination exhibiting a composite impedance equal to impedance of said other elements coupled to said computer processor bus at an operating frequency.

13. The multiprocessor computer system of claim 12 wherein said operating frequency is greater than 66 MHz.

14. The multiprocessor computer system of claim 12 wherein said first bus termination and said second bus termination have an impedance of approximately 120 ohms.

15. The multiprocessor computer system of claim 11 further comprising a first memory coupled to said first chipset and a second memory coupled to said second chipset.

16. The multiprocessor computer system of claim 13 wherein said first memory and said second memory is dynamic random access memories (DRAM).

17. The multiprocessor computer system of claim 11 wherein said first quad processor and said second quad processor are INTEL PENTIUM II XEON processors.

18. The multiprocessor computer system of claim 11 wherein said first chipset is a memory controller/host-to-PCI/APG bridge and said second chipset is a memory controller/host-to-PCI bridge.

19. The multiprocessor computer system of claim 11 further comprising a floppy drive.

20. The multiprocessor computer system of claim 11 wherein said computer processor bus is an Assisted Gunning Transceiver Logic Plus (AGTL+) bus.

* * * * *

UNITED STATES PATENT AND TRADEMARK OFFICE
CERTIFICATE OF CORRECTION

PATENT NO.    : 6,067,596
DATED         : May 23, 2000
INVENTOR(S)   : Nguyen et al.

Page 1 of 1

It is certified that error appears in the above-identified patent and that said Letters Patent is hereby corrected as shown below:

Column 10,
Line 58, delete "claim 1" and insert therefor -- claim 11 --.

Signed and Sealed this

Sixth Day of September, 2005

JON W. DUDAS
*Director of the United States Patent and Trademark Office*